(12) United States Patent
Wang et al.

(10) Patent No.: US 10,935,833 B2
(45) Date of Patent: Mar. 2, 2021

(54) DISPLAY APPARATUS AND DISPLAY SUBSTRATE HAVING A DISPLAY AREA AND A BLACK MATRIX AREA, AND METHOD OF FABRICATING DISPLAY SUBSTRATE AND DISPLAY APPARATUS

(71) Applicants: Chongqing BOE Optoelectronics Technology Co., Ltd., Chongqing (CN); BOE TECHNOLOGY GROUP CO., LTD., Beijing (CN)

(72) Inventors: Xiaoyuan Wang, Beijing (CN); Yan Fang, Beijing (CN); Wu Wang, Beijing (CN); Ruilin Bi, Beijing (CN); Yajie Bai, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/344,874

(22) PCT Filed: May 29, 2018

(86) PCT No.: PCT/CN2018/088870
§ 371 (c)(1),
(2) Date: Apr. 25, 2019

(87) PCT Pub. No.: WO2019/227310
PCT Pub. Date: Dec. 5, 2019

(65) Prior Publication Data
US 2019/0369437 A1 Dec. 5, 2019

(51) Int. Cl.
*G02F 1/1335* (2006.01)
*G02F 1/1339* (2006.01)
(Continued)

(52) U.S. Cl.
CPC ...... *G02F 1/133512* (2013.01); *G02F 1/1368* (2013.01); *G02F 1/13394* (2013.01);
(Continued)

(58) Field of Classification Search
CPC .......... G02F 1/133512; G02F 1/13394; G02F 2001/13396; G02F 2001/13398;
(Continued)

(56) References Cited

U.S. PATENT DOCUMENTS

| 2005/0117094 A1 | 6/2005 | Kim et al. |
| 2006/0164583 A1* | 7/2006 | Nakao ............... G02F 1/134309 349/126 |

(Continued)

FOREIGN PATENT DOCUMENTS

| CN | 1624552 A | 6/2005 |
| CN | 1860407 A | 11/2006 |

(Continued)

OTHER PUBLICATIONS

International Search Report & Written Opinion dated Feb. 27, 2019, regarding PCT/CN2018/088870.

*Primary Examiner* — Nathanael R Briggs
*Assistant Examiner* — William D Peterson
(74) *Attorney, Agent, or Firm* — Intellectual Valley Law, P.C.

(57) ABSTRACT

The present application provides a display apparatus having a display area and a black matrix area surrounding the display area. The display apparatus includes a first display substrate and a second display substrate opposite to each other and assembled together. The first display substrate includes a first base substrate, and a black matrix on the first base substrate and in the black matrix area. The second display substrate includes a second base substrate, and an array of a plurality of thin film transistors on the second base (Continued)

substrate for driving image display in the display apparatus. The black matrix has a serrated edge surrounding the display area.

17 Claims, 13 Drawing Sheets

(51) Int. Cl.
*G02F 1/1368* (2006.01)
*G02F 1/1337* (2006.01)
*G02F 1/1343* (2006.01)
*G02F 1/1362* (2006.01)

(52) U.S. Cl.
CPC .. *G02F 1/133784* (2013.01); *G02F 1/134363* (2013.01); *G02F 2001/13396* (2013.01); *G02F 2001/13398* (2013.01); *G02F 2001/136222* (2013.01)

(58) Field of Classification Search
CPC ....... G02F 2001/136222; G02F 1/1368; G02F 1/133784; G02F 1/134363
USPC .......................................................... 349/42
See application file for complete search history.

(56) References Cited

U.S. PATENT DOCUMENTS

2016/0291425 A1* 10/2016 Ma .................... G02F 1/134363
2019/0155116 A1* 5/2019 Deng .................... G02F 1/1303
2019/0235307 A1 8/2019 Wang et al.

FOREIGN PATENT DOCUMENTS

| CN | 205880431 U | | 1/2017 |
|----|-------------|---|--------|
| CN | 107065338 A | * | 8/2017 |
| CN | 107065338 A | | 8/2017 |
| CN | 107255883 A | | 10/2017 |
| JP | 2003295191 A | | 10/2003 |

* cited by examiner

DISPLAY APPARATUS AND DISPLAY SUBSTRATE HAVING A DISPLAY AREA AND A BLACK MATRIX AREA, AND METHOD OF FABRICATING DISPLAY SUBSTRATE AND DISPLAY APPARATUS

CROSS-REFERENCE TO RELATED APPLICATION

This application is a national stage application under 35 U.S.C. § 371 of International Application No. PCT/CN2018/088870, filed May 29, 2019, the contents of which are incorporated by reference in the entirety.

TECHNICAL FIELD

The present invention relates to display technology, more particularly, to a display apparatus having a display area and a black matrix area, a display substrate having a display area and a black matrix area, a method of fabricating a display substrate, and a method of fabricating a display apparatus.

BACKGROUND

Typically, a liquid crystal display panel includes an array substrate and a color filter substrate assembled together. The liquid crystal display panel further includes a liquid crystal layer between the array substrate and the color filter substrate, and a spacer layer for maintaining a spacing between the array substrate and the color filter substrate.

SUMMARY

In one aspect, the present invention provides a display apparatus having a display area and a black matrix area surrounding the display area, comprising a first display substrate and a second display substrate opposite to each other and assembled together; wherein the first display substrate comprises a first base substrate, and a black matrix on the first base substrate and in the black matrix area; wherein the second display substrate comprises a second base substrate, and an array of a plurality of thin film transistors on the second base substrate for driving image display in the display apparatus; wherein the black matrix has a serrated edge surrounding the display area.

Optionally, the first display substrate further comprises a main spacer layer configured to maintain a spacing between the first display substrate and the second display substrate; wherein the main spacer layer and the black matrix are made of a same material and in a same layer.

Optionally, the first display substrate further comprises an auxiliary spacer layer; wherein the main spacer layer, the auxiliary spacer layer, and the black matrix are made of a same material and in a same layer.

Optionally, the black matrix has a first side facing the first base substrate, a second side substantially opposite to the first side and facing away the first base substrate, and a third side along the serrated edge connecting the first side and the second side; and the third side has an average slope angle with respect to the first side less than approximately 60 degrees.

Optionally, the first display substrate further comprises an alignment film on the first base substrate and at least partially covering the third side of the black matrix.

Optionally, the display apparatus has an array of a plurality of subpixels; and the serrated edge of the black matrix at least partially extends into regions corresponding to multiple subpixels of the plurality of subpixels along an edge of the display area.

Optionally, the second display substrate further comprises a color filter on the second base substrate; the color filter comprises a plurality of color filter blocks respectively in a plurality of subpixels in the display area, and one or more light shielding color filter blocks in the black matrix area; and an orthographic projection of the black matrix on the first base substrate substantially overlaps with an orthographic projection of the one or more light shielding color filter blocks on the first base substrate.

Optionally, the serrated edge comprises a plurality of teeth, each of which having a substantially triangular shape.

Optionally, the display apparatus is an in-plane switching type liquid crystal display apparatus; wherein the second display substrate further comprises a common electrode and a pixel electrode substantially on a same horizontal plane.

In another aspect, the present invention provides a display substrate having a display area and a black matrix area surrounding the display area, comprising a base substrate, and a black matrix on the base substrate and in the black matrix area; wherein the black matrix has a serrated edge surrounding the display area.

Optionally, the display substrate further comprises a main spacer layer, wherein the main spacer layer and the black matrix are made of a same material and in a same layer.

Optionally, the display substrate further comprises an auxiliary spacer layer; wherein the main spacer layer, the auxiliary spacer layer, and the black matrix are made of a same material and in a same layer.

Optionally, the black matrix has a first side facing the base substrate, a second side substantially opposite to the first side and facing away the base substrate, and a third side along the serrated edge connecting the first side and the second side; and the third side has an average slope angle with respect to the first side less than approximately 60 degrees.

Optionally, the display substrate further comprises an alignment film on the base substrate and at least partially covering the third side of the black matrix.

Optionally, the serrated edge comprises a plurality of teeth, each of which having a substantially triangular shape.

In another aspect, the present invention provides a method of fabricating a first display substrate having a display area and a black matrix area surrounding the display area, comprising forming a black matrix on a first base substrate and in the black matrix area; wherein the black matrix is formed to have a serrated edge surrounding the display area.

Optionally, forming the black matrix comprises forming a black matrix material layer on the first base substrate; forming a photoresist layer on a side of the black matrix material layer distal to the first base substrate; exposing the photoresist layer with a mask plate having a sub-resolution feature corresponding to the serrated edge of the black matrix thereby obtaining an exposed photoresist layer, developing the exposed photoresist layer to obtain a photoresist pattern including a first section corresponding to the black matrix and a second section corresponding to a remaining portion of the exposed photoresist layer, photoresist material being removed in the second section; and etching the black matrix material layer in the second section, thereby obtaining the black matrix with the serrated edge.

Optionally, the method further comprises forming a main spacer layer in a same patterning step as the black matrix;

wherein the main spacer layer and the black matrix are formed in a same layer, and using a same material and a same mask plate.

Optionally, the black matrix is formed to have a first side facing the first base substrate, a second side substantially opposite to the first side and facing away the first base substrate, and a third side along the serrated edge connecting the first side and the second side; and the third side is formed to have an average slope angle with respect to the first side less than approximately 60 degrees.

In another aspect, the present invention provides a method of fabricating a display apparatus, comprising forming the first display substrate according to the method described herein; forming a second display substrate comprising an array of a plurality of thin film transistors on a second base substrate; and assembling the first display substrate and the second display substrate together thereby forming a cell.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
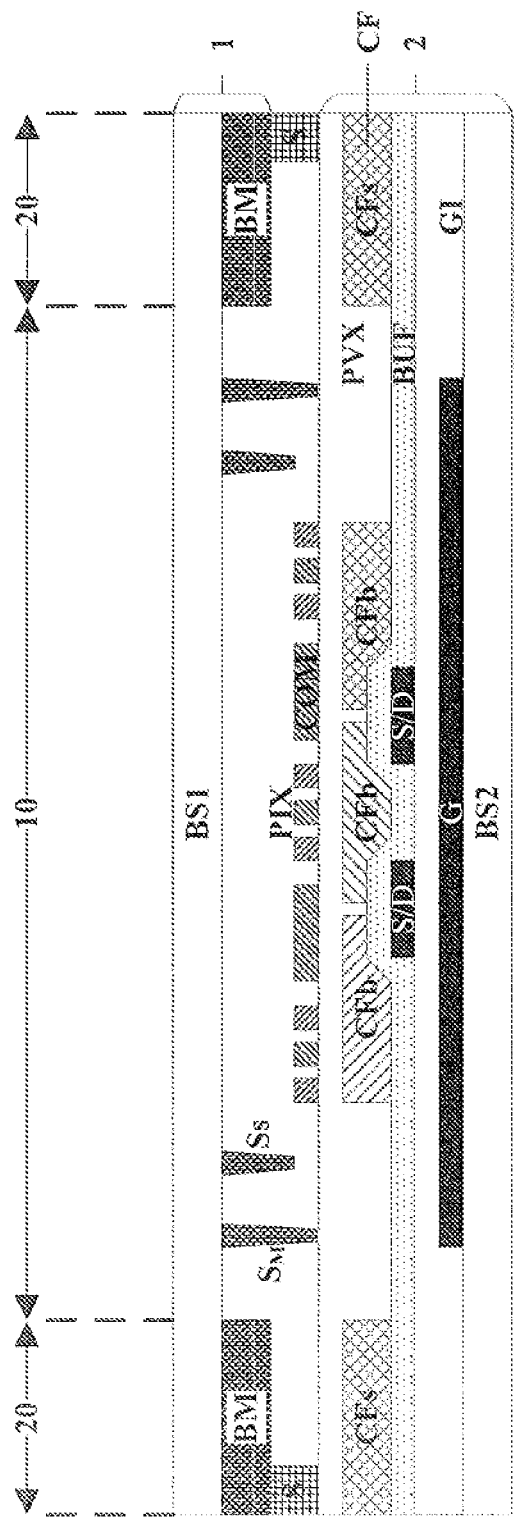
FIG. 1 is a schematic diagram illustrating the structure of a display apparatus in some embodiments according to the present disclosure.

FIG. 1 is a schematic diagram illustrating the structure of a display apparatus in some embodiments according to the present disclosure. Referring to FIG. 1, the display apparatus in some embodiments has a display area 10 and a black matrix area 20. The display apparatus includes a first display substrate 1 and a second display substrate 2 opposite to each other and assembled together to form a cell. The first display substrate 1 in some embodiments includes a first base substrate BS1, a black matrix BM on the first base substrate BS1, a main spacer layer $S_M$ and an auxiliary spacer layer $S_S$ on the first base substrate BS1. The second display substrate 2 in some embodiments includes a second base substrate BS2, a gate layer G on the second base substrate BS2, a gate insulating layer GI on a side of the gate layer G distal to the second base substrate BS2, a source and drain electrode layer S/D on a side of the gate insulating layer GI distal to the second base substrate BS2, a buffer layer BUF on a side of the source and drain electrode layer S/D distal to the gate insulating layer GI, a color filter CF on a side of the buffer layer BUF distal to the gate insulating layer GI, a passivation layer PVX on a side of the color filter CF distal to the buffer layer BUF, and a pixel electrode PIX and a common electrode COM on a side of the passivation layer PVX distal to the second base substrate BS2. The color filter CF includes a plurality of color filter blocks CFb in the display area 10, each of which in one of the plurality of subpixels. The color filter CF further includes one or more light shielding color filter blocks CFs in the black matrix area 20. The one or more light shielding color filter blocks CFs shields light together with the black matrix BM.

Referring to FIG. 1, the first display substrate 1 and the second display substrate 2 are assembled together through a sealant S sealing the first display substrate 1 and the second display substrate 2 together. In some embodiments, the display apparatus is absent of an overcoat layer in the first display substrate 1. For example, the black matrix BM, the main spacer layer $S_M$, and the auxiliary spacer layer $S_S$ are formed on the first base substrate BS1, without being covered by an overcoat layer. In some embodiments, when the first display substrate 1 and the second display substrate 2 are assembled into a display apparatus, e.g., a liquid crystal display apparatus, the black matrix BM is in direct contact with the sealant S. In one example, the black matrix BM, the main spacer layer $S_M$, and the auxiliary spacer layer $S_S$ constitute a same layer, e.g., made of a same black photo spacer material, and made in a same patterning process using a same mask plate. Optionally, the same layer containing the black matrix BM, the main spacer layer $S_M$, and the auxiliary spacer layer $S_S$ constitutes the outmost layer of the first display substrate 1 facing the second display substrate 2, and is in contact with a liquid crystal layer between the first display substrate 1 and the second display substrate 2.

As used herein, the term "same layer" refers to the relationship between the layers simultaneously formed in the same step. In one example, the black matrix BM, the main spacer layer $S_M$, and the auxiliary spacer layer $S_S$ are in a same layer when they are formed as a result of one or more steps of a same patterning process performed in a same layer of material. In another example, the black matrix BM, the main spacer layer $S_M$, and the auxiliary spacer layer $S_S$ can be formed in a same layer by simultaneously performing the step of forming the black matrix BM, the step of forming the main spacer layer $S_M$, and the step of forming the auxiliary spacer layer $S_S$. The term "same layer" does not always mean that the thickness of the layer or the height of the layer in a cross-sectional view is the same. For example, a half-tone or a gray-tone mask plate may be used for patterning the same layer containing the black matrix BM, the main spacer layer $S_M$, and the auxiliary spacer layer $S_S$, which have different heights relative to the first base substrate BS1.

Figure 2:
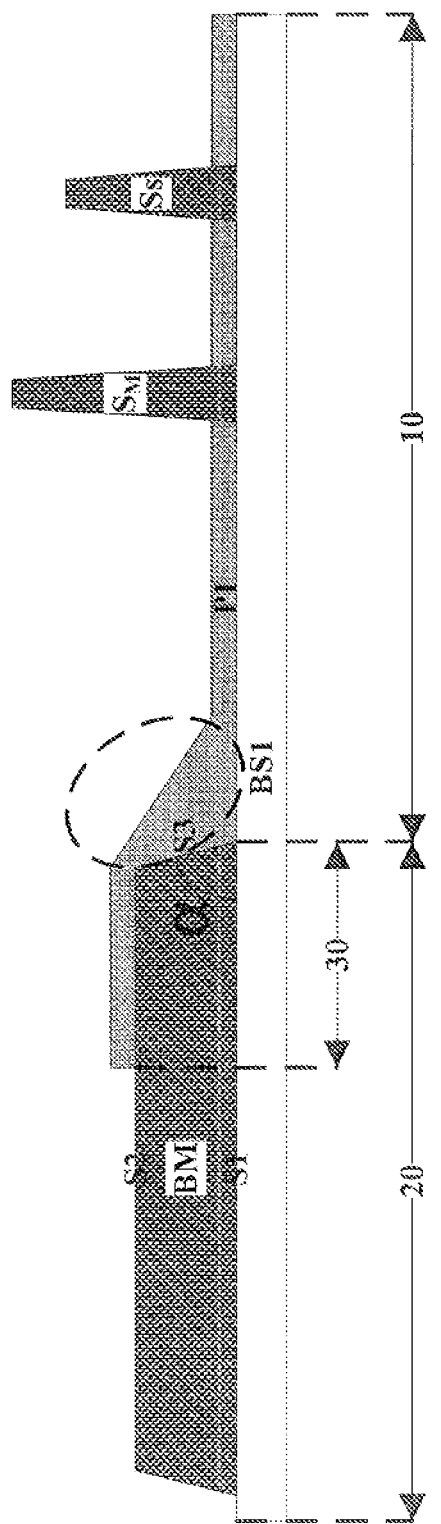
FIG. 2 illustrates formation of an alignment film on a first display substrate of a display apparatus in some embodiments according to the present disclosure.

The black matrix BM in some embodiments is formed to have a relatively large slope angle with respect to the first base substrate BS1, thereby forming a large segment difference along the edge of the black matrix BM adjacent to the display area 10. FIG. 2 illustrates formation of an alignment film on a first display substrate of a display apparatus in some embodiments according to the present disclosure. Referring to FIG. 2, the black matrix BM has a first side S1 facing the first base substrate BS1, a second side S2 substantially opposite to the first side S1 and facing away the first base substrate BS1, and a third side S3 connecting the first side S and the second side S2, the third side S3 along an edge of the black matrix BM abutting the display area 10. The third side S3 has an average slope angle α with respect to the first side S1. The average slope angle α is relatively large, resulting in a large segment difference along the edge of the black matrix BM abutting the display area 10. Optionally, the average slope angle α is in a range of greater than 60 degrees, e.g., greater than 65 degrees, greater than 70 degrees, greater than 75 degrees, greater than 80 degrees, greater than 85 degrees, greater than 90 degrees, and greater than 95 degrees.

An alignment film PI is formed on the first base substrate BS1, an orthographic projection of the alignment film PI on the first base substrate BS1 partially overlaps with an orthographic projection of the black matrix BM in an overlapping region 30. The alignment film PI at least partially covering the third side S3 of the black matrix BM. Referring to FIG. 2, due to the large segment difference along the edge of the black matrix BM, the alignment material of the alignment film PI accumulates along the edge of the black matrix BM (the dotted circle in FIG. 2 depicts accumulation of alignment material). Accordingly, the alignment film PI in regions corresponding to the edge of the black matrix BM has a relatively large thickness. The alignment film PI is subsequently rubbed to achieve an alignment direction in the alignment film PI. Due to the large thickness of the alignment film PI along the edge of the black matrix BM, rubbing is often ineffective to achieve a desired alignment direction, resulting in display mura in the display area 10 in regions directly adjacent to the edge of the black matrix BM. Moreover, the rubbing action often damages a portion of the black matrix BM along the edge due to the large segment difference, producing small particles of the black matrix materials. These small particles may be brought into the display area 10 by the rubbing action, resulting in display defects in the display area 10.

Accordingly, the present disclosure provides, inter alia, a display apparatus having a display area and a black matrix area, a display substrate having a display area and a black matrix area, a method of fabricating a display substrate, and a method of fabricating a display apparatus that substantially obviate one or more of the problems due to limitations and disadvantages of the related art. In one aspect, the present disclosure provides a display apparatus having a display area and a black matrix area. In some embodiments, the display apparatus includes a first display substrate and a second display substrate opposite to each other and assembled together. The first display substrate includes a first base substrate, and a black matrix on the first base substrate and in the black matrix area. The second display substrate includes a second base substrate, and an array of a plurality of thin film transistors on the second base substrate for driving image display in the display apparatus. The black matrix has a serrated edge surrounding the display area. As used herein, the term "serrated edge" refers to a boundary line of an object that has a repeating pattern of teeth, ridges, peaks, points, notches, jags, projections and/or protrusions extending from the surface thereof. These serrations can be of any shape, optionally having points or sharp edges, or optionally having round edges. Although a serration is generally referred to as extending from a surface, one of skill in the art would recognize that a serration may be formed by removing portions of a surface to form valleys, troughs or the like resulting in the creation of corresponding serrations extending from a new surface.

Figure 3:
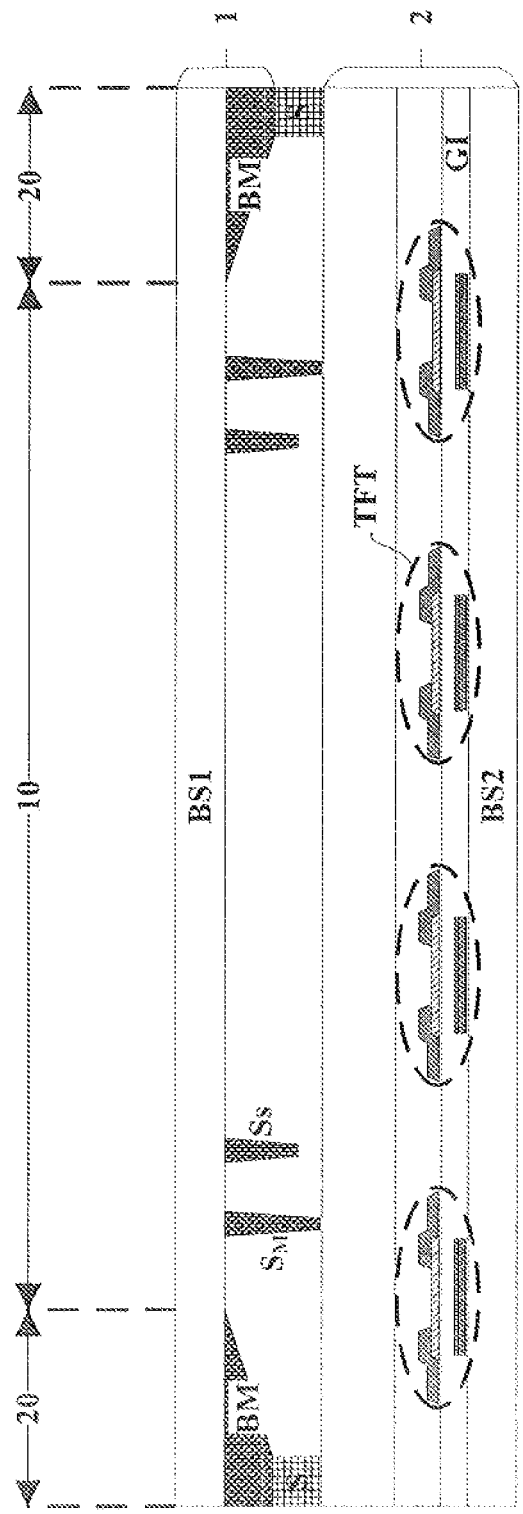
FIG. 3 is a schematic diagram illustrating the structure of a display apparatus in some embodiments according to the present disclosure.
Figure 4:
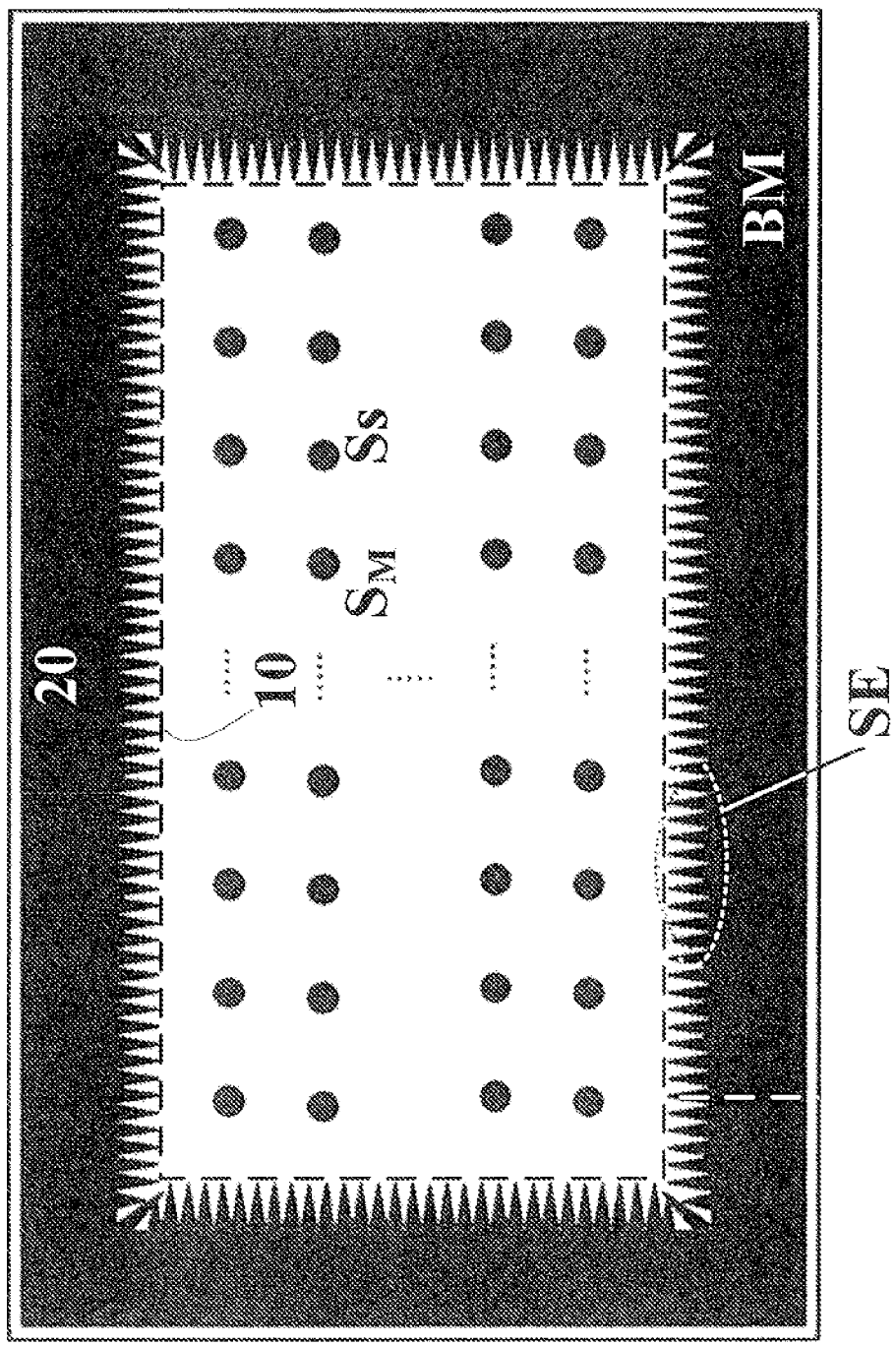
FIG. 4 is a plan view of the first display substrate of a display apparatus in some embodiments according to the present disclosure.

FIG. 3 is a schematic diagram illustrating the structure of a display apparatus in some embodiments according to the present disclosure. FIG. 4 is a plan view of the first display substrate of a display apparatus in some embodiments according to the present disclosure. Referring to FIG. 3 and FIG. 4, the display apparatus in some embodiments has a display area 10 and a black matrix area 20 surrounding the display area 10. The display apparatus includes a first display substrate 1 and a second display substrate 2 opposite to each other and assembled together. The second display substrate 2 includes a second base substrate BS2, and an array of a plurality of thin film transistors TFT on the second base substrate BS2 for driving image display in the display apparatus. The first display substrate 1 includes a first base substrate BS1, and a black matrix BM on the first base substrate BS1 and in the black matrix area 20. In some embodiments, the black matrix BM has a serrated edge SE surrounding the display area 10. Optionally, and as shown in FIG. 4, the serrated edge SE includes a plurality of teeth.

Figure 5:
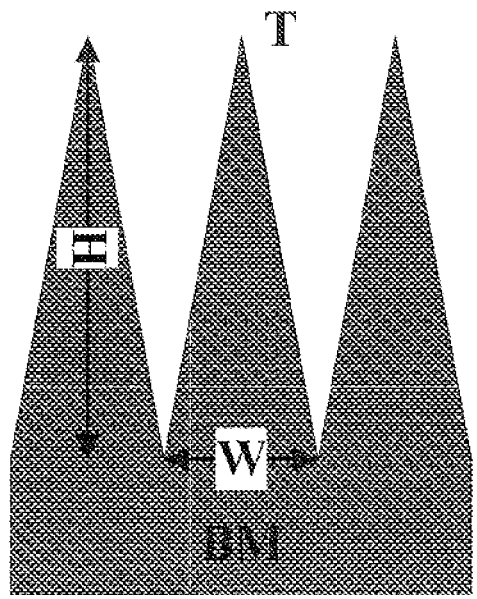
FIG. 5 illustrates an exemplary shape and dimension of a plurality of teeth of a serrated edge of a black matrix in some embodiments according to the present disclosure.
Figure 6:
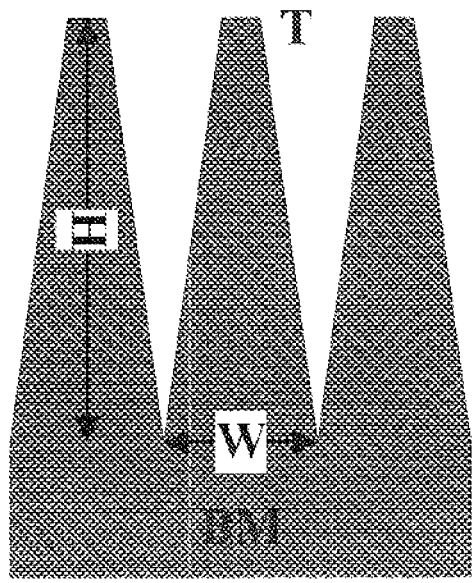
FIG. 6 illustrates an exemplary shape and dimension of a plurality of teeth of a serrated edge of a black matrix in some embodiments according to the present disclosure.
Figure 7:
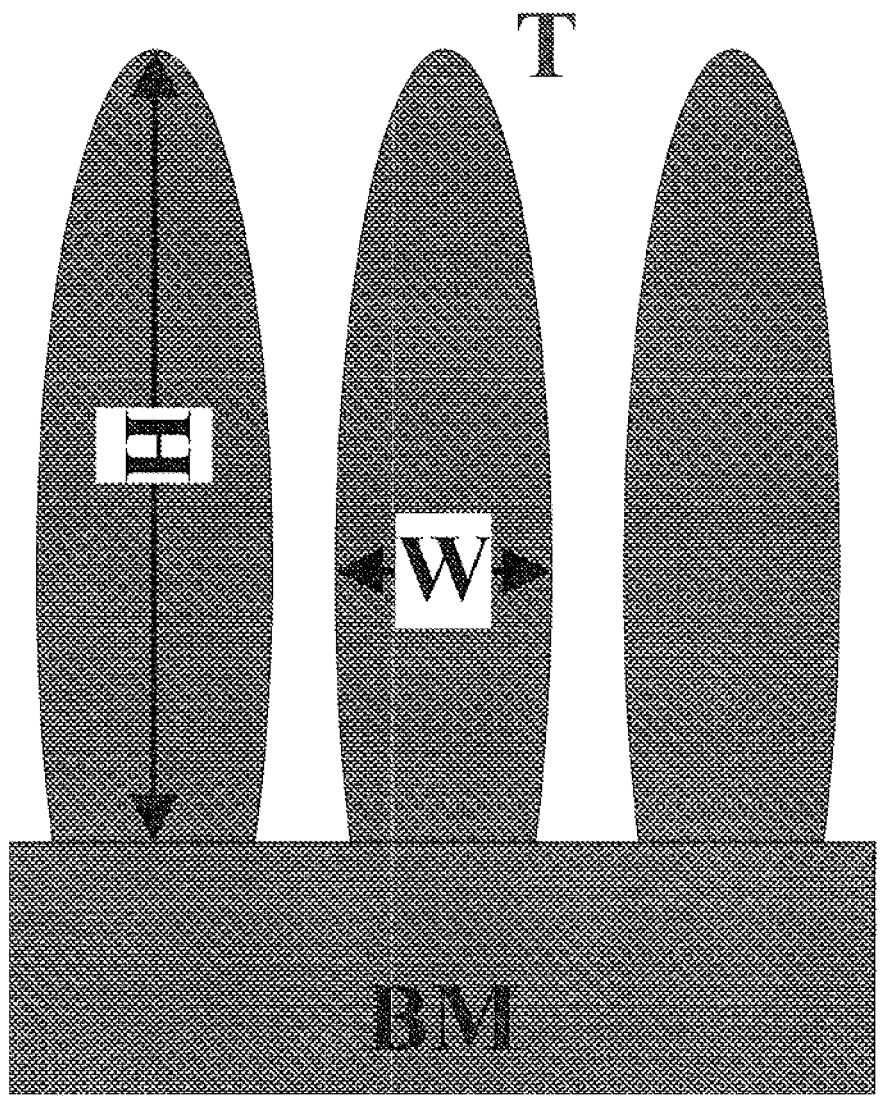
FIG. 7 illustrates an exemplary shape and dimension of a plurality of teeth of a serrated edge of a black matrix in some embodiments according to the present disclosure.

The plurality of teeth may be made of various appropriate shapes and dimensions. FIGS. 5 to 7 illustrate several exemplary shapes and dimensions of a plurality of teeth T of a serrated edge of a black matrix in some embodiments according to the present disclosure. Referring to FIG. 5, each of the plurality of teeth T has a substantially triangular shape. Referring to FIG. 6, each of the plurality of teeth T has a substantially trapezoidal shape. Referring to FIG. 7, each of the plurality of teeth T has a substantially elliptical shape. Optionally, one or more of the plurality of teeth has an irregular shape. Optionally, one or more of the plurality of teeth has a regular polygonal shape. Optionally, substantially all of the plurality of teeth in the serrated edge SE have a substantially the same shape. Optionally, the serrated edge SE includes at least a plurality of first teeth having a first shape and a plurality of second teeth having a second shape.

The plurality of teeth may have various appropriate maximum tooth length H. As used herein, the term "tooth length" refers to a height of one of the plurality of teeth T relative to a side of the one of the plurality of teeth T connecting to a main body of the black matrix BM. In some embodiments, the maximum tooth length H is approximately ¼ to ½ of a longitudinal width of a subpixel in the display apparatus. In some embodiments, the maximum tooth length H is approximately ¼ to ½ of a lateral width of a subpixel in the display apparatus. Optionally, the maximum tooth length H is in a range of approximately 10 μm to approximately 300 μm, e.g., approximately 10 μm to approximately 20 μm, approximately 20 μm to approximately 30 μm, approximately 30 μm to approximately 40 μm, approximately 40 μm to approximately 50 μm, approximately 50 μm to approximately 60 m, approximately 60 μm to approximately 70 μm, approximately 70 μm to approximately 80 μm, approximately 80 μm to approximately 90 μm, approximately 90 μm to approximately 100 μm, approximately 100 μm to approximately 125 μm, approximately 125 μm to approximately 150 μm, approximately 150 μm to approximately 175 μm, approximately 175 μm to approximately 200 μm, approximately 200 μm to approximately 225 μm, approximately 225 μm to approximately 250 μm, approximately 250 μm to approximately 275 pun, and approximately 275 μm to approximately 300 μm. Optionally, the maximum tooth length H is in a range of approximately 10 μm to approximately 30 μm.

The plurality of teeth may have various appropriate maximum tooth width W. As used herein, the term "tooth width" refers to a width of one of the plurality of teeth T on a side connected to a main body of the black matrix BM. In some embodiments, the maximum tooth width W is in a range of approximately 4 μm to approximately 200 μm, e.g., approximately 4 μm to approximately 10 μm, approximately 10 μm to approximately 20 μm, approximately 20 μm to approximately 30 μm, approximately 30 μm to approximately 40 μm, approximately 40 μm to approximately 50 μm, approximately 50 μm to approximately 60 μm, approximately 60 μm to approximately 70 μm, approximately 70 μm to approximately 80 μm, approximately 80 μm to approximately 90 μm, approximately 90 μm to approximately 100 μm, approximately 100 μm to approximately 125 μm, approximately 125 μm to approximately 150 μm, approximately 150 μm to approximately 175 μm, and approximately 175 μm to approximately 200 μm. Optionally, the maximum tooth width W is in a range of approximately 4 μm to approximately 20 μm. Optionally, the maximum tooth width W is equivalent to a pitch of the plurality of teeth T of the serrated edge SE.

In some embodiments, a ratio of the maximum tooth length H to the maximum tooth width W is in a range of approximately 1:1 to approximately 10:1, e.g., approximately 1:1 to approximately 1.2:1, approximately 1.2:1 to approximately 1.4:1, approximately 1.4:1 to approximately 1.6:1, approximately 1.6:1 to approximately 1.8:1, approximately 1.8:1 to approximately 2:1, approximately 2:1 to approximately 2.5:1, approximately 2.5:1 to approximately 3:1, approximately 3.5:1 to approximately 4:1, approximately 4:1 to approximately 4.5:1, approximately 4.5:1 to approximately 5:1, approximately 5:1 to approximately 6:1, approximately 6:1 to approximately 7:1, approximately 7:1 to approximately 8:1, approximately 8:1 to approximately 9:1, and approximately 9:1 to approximately 10:1. Optionally, the ratio of the maximum tooth length H to the maximum tooth width W is in a range of approximately 1.5:1 to approximately 2.5:1.

Optionally, the plurality of teeth T distribute substantially throughout an entirety of a periphery of the serrated edge SE. Optionally, the plurality of teeth T distribute substantially throughout an entirety of a periphery of the serrated edge SE including any corner portion of the black matrix BM. Optionally, the plurality of teeth T distribute substantially throughout an entirety of a periphery of the serrated edge SE except for one or more corner portions of the black matrix BM. Optionally, adjacent teeth of the plurality of teeth T are directly abutting each other, e.g., adjacent teeth are not spaced apart by a spacing (see, e.g., FIG. 5 and FIG. 6). Optionally, adjacent teeth of the plurality of teeth T are spaced apart by a small distance (see, e.g., FIG. 7). Optionally, the small distance spacing apart adjacent teeth is smaller than the maximum tooth width W, e.g., by at least 90%, at least 80%, at least 70%, at least 60%, at least 50%, at least 40%, at least 30%, at least 20%, and at least 10%.

Figure 8:
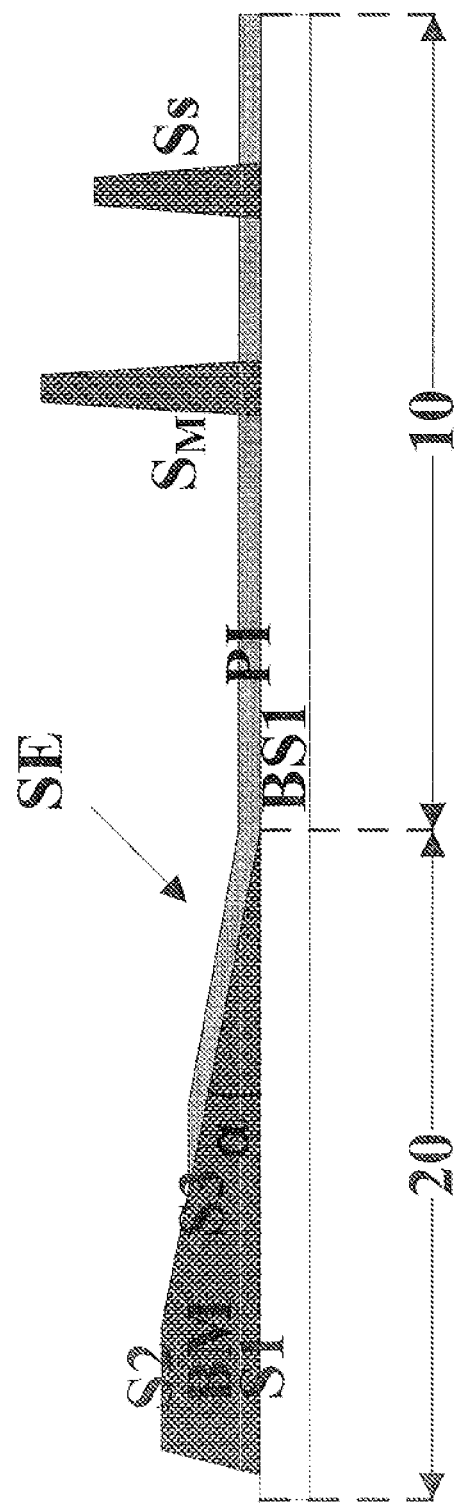
FIG. 8 illustrates formation of an alignment film on a first display substrate of a display apparatus in some embodiments according to the present disclosure.

FIG. 8 illustrates formation of an alignment film on a first display substrate of a display apparatus in some embodiments according to the present disclosure. Referring to FIG. 8, the black matrix BM has a first side S1 facing the first base substrate BS1, a second side S2 substantially opposite to the first side S1 and facing away the first base substrate BS1, and a third side S3 connecting the first side S1 and the second side S2, the third side S3 along the serrated edge SE of the black matrix BM abutting the display area 10. The third side S3 has an average slope angle α with respect to the first side S1. The average slope angle α is relatively small, resulting in a small segment difference along the serrated edge of the black matrix BM abutting the display area 10. Optionally, the average slope angle α is in a range of less than 60 degrees, e.g., less than 55 degrees, less than 50 degrees, less than 45 degrees, less than 40 degrees, less than 35 degrees, less than 30 degrees, less than 25 degrees, less than 20 degrees, less than 15 degrees, and less than 10 degrees. Optionally, the average slope angle α is in a range of less than 30 degrees.

An alignment film PI is formed on the first base substrate BS1 and at least partially covering the third side S3 along the serrated edge SE of the black matrix BM. Referring to FIG. 8, due to the small segment difference along the serrated edge SE of the black matrix BM, the alignment material of the alignment film PI does not accumulate along the serrated edge SE of the black matrix BM. Accordingly, the alignment film PI in regions corresponding to the serrated edge SE of the black matrix BM has a relatively small and uniform thickness. Moreover, the thickness of the alignment film PI in regions corresponding to the serrated edge SE of the black matrix BM is substantially the same as the thickness of the alignment film PI in the display area 10 (e.g., a central region of the display area 10). Optionally, the thickness of the alignment film PI in regions corresponding to the serrated edge SE of the black matrix BM is within ±20% (e.g., within ±15%, within ±10%, and within ±5%) of an average thickness of the alignment film PI in the display area 10. Optionally, the thickness of the alignment film PI in regions corresponding to the serrated edge SE of the black matrix BM is within ±20% (e.g., within ±15%, within ±10%, and within ±5%) of an average thickness of the alignment film PI in the central region of the display area 10. When the alignment film PI is subsequently rubbed to achieve an alignment direction in the alignment film PI, a uniform alignment direction can be achieved throughout the alignment film PI, e.g., in both the central region of the display area 10 and in a peripheral region of the display area 10 along the serrated edge SE of the black matrix BM, obviating display mura due to accumulation of the alignment material along the edge of the black matrix BM (see, e.g., FIG. 2). Moreover, because the segment difference of the serrated edge SE of the black matrix BM is very small, rubbing the alignment film PI along the serrated edge SE of the black matrix BM would not produce small particles of black matrix material, further obviating display defects in the display area 10 due to contamination of small particles of black matrix material.

In some embodiments, and referring to FIG. 3, the first display substrate 1 further includes a main spacer layer $S_M$ configured to maintain a spacing between the first display substrate 1 and the second display substrate 2. The main spacer layer $S_M$ and the black matrix BM are made of a same material and in a same layer, e.g., made of a same black photo spacer material, made in a same patterning process using a same mask plate. In some embodiments, the first display substrate 1 further includes an auxiliary spacer layer $S_S$. The main spacer layer $S_M$, the auxiliary spacer layer $S_S$, and the black matrix BM are made of a same material and in a same layer, e.g., made of a same black photo spacer material, made in a same patterning process using a same mask plate.

Figure 9:
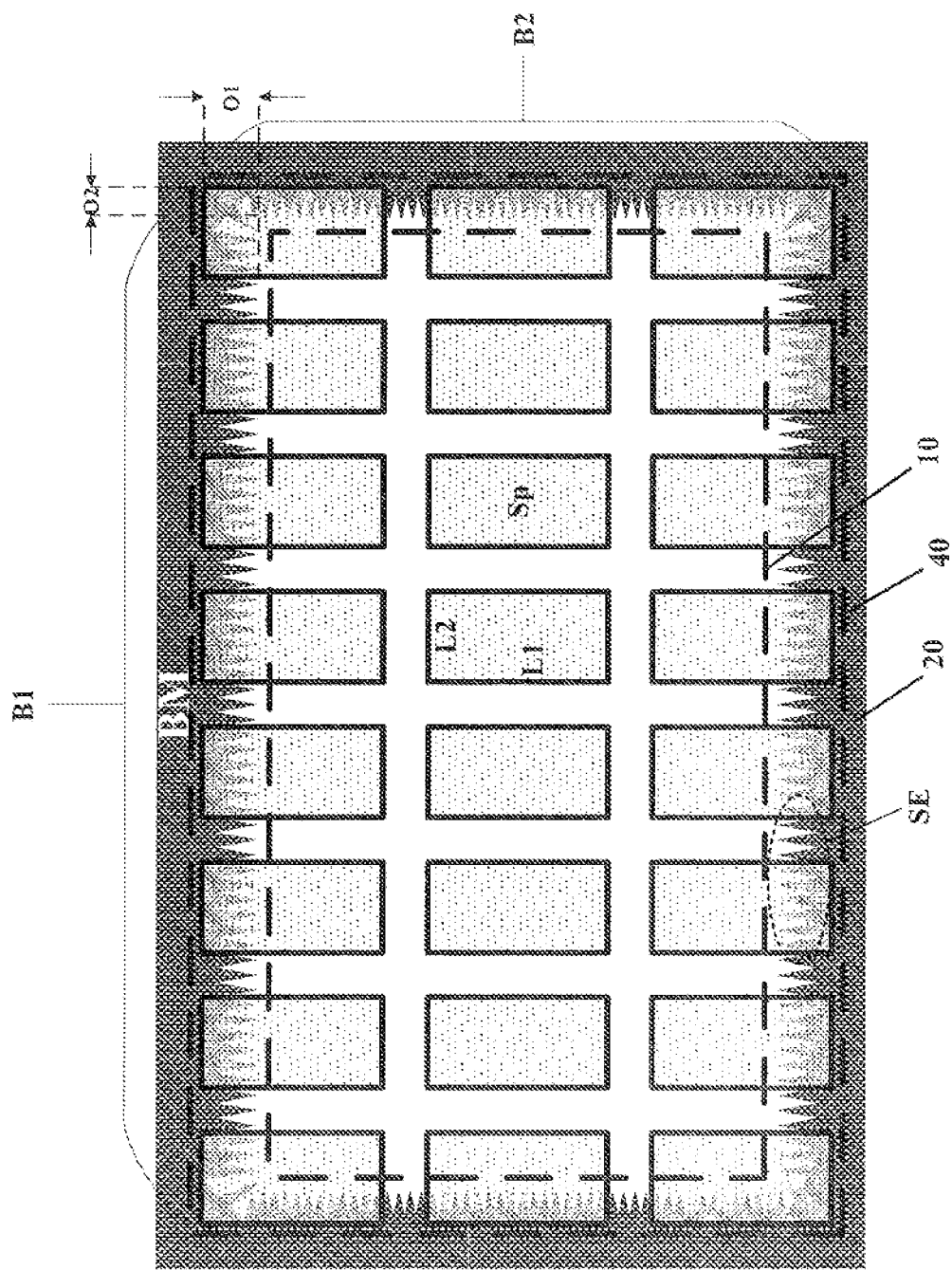
FIG. 9 is a schematic diagram illustrating a plurality of subpixels in a display apparatus in some embodiments according to the present disclosure.

FIG. 9 is a schematic diagram illustrating a plurality of subpixels in a display apparatus in some embodiments according to the present disclosure. Referring to FIG. 9, the display apparatus in some embodiments has an array of a plurality of subpixels Sp, accumulatively forming a subpixel area 40. The serrated edge SE of the black matrix BM at least partially extends into the subpixel area 40 along an edge of the display area 10, thereby resulting in a partially overlapping region between the black matrix area 20 and the subpixel area 40. Optionally, the subpixel area 40 is a sum of the display area 10 and the partially overlapping region.

In some embodiments, the plurality of subpixels Sp are arranged in an array of a plurality of rows and a plurality of columns. Each of the plurality of subpixels Sp has a long side L1 and a short side L2. The short sides L2 of a row of a plurality of subpixels Sp form one or more portions of a boundary of the subpixel area 40 (e.g., B1 portion of the boundary), and the long sides L1 of a column of a plurality of subpixels Sp form another one or more portions of the boundary of the subpixel area 40 (e.g., B2 portion of the boundary). Along the B1 portion of the boundary of the subpixel area 40, the serrated edge SE of the black matrix BM extends into the subpixel area 40 by a length O1. Along the B2 portion of the boundary of the subpixel area 40, the serrated edge SE of the black matrix BM extends into the subpixel area 40 by a length O2. Optionally, the long side L1 is approximately 300 μm. Optionally, the short side L2 is approximately 100 μm.

In some embodiments, the length O1 is approximately ¼ to approximately ½ (e.g., approximately ¼ to approximately ⅓, and approximately ⅓ to approximately ½) of the long side L1 of each of the plurality of subpixels Sp. Optionally, the length O1 is in a range of approximately 10 μm to approximately 300 μm, e.g., approximately 10 μm to approximately 20 μm, approximately 20 μm to approximately 30 μm, approximately 30 μm to approximately 40 μm, approximately 40 μm to approximately 50 μm, approximately 50 μm to approximately 60 μm, approximately 60 μm to approximately 70 μm, approximately 70 μm to approximately 80 μm, approximately 80 μm to approximately 0 μm, approximately approximately 90 μm to approximately 100 μm, approximately 100 μm to approximately 125 μm, approximately 125 μm to approximately 150 μm, approximately 150 μm to approximately 175 μm, approximately 175 μm to approximately 200 μm, approximately 200 μm to approximately 225 μm, approximately 225 μm to approximately 250 μm, approximately 250 μm to approximately 275 μm, and approximately 275 μm to approximately 300 μm. Optionally, the length O1 is in a range of approximately 75 μm to approximately 150 μm, e.g., approximately 100 μm.

In some embodiments, the length O2 is approximately ¼ to approximately ½ (e.g., approximately ¼ to approximately ⅓, and approximately ⅓ to approximately ½) of the short side L2 of each of the plurality of subpixels Sp. Optionally, the length O2 is in a range of approximately 3 μm to approximately 100 μm, e.g., approximately 3 μm to approximately 5 μm, approximately 5 μm to approximately 10 μm, approximately 10 μm to approximately 20 μm, approximately 20 μm to approximately 30 μm, approximately 30 μm to approximately 40 μm, approximately 40 μm to approximately 50 μm, approximately 50 μm to approximately 60 μm, approximately 60 μm to approximately 70 μm, approximately 70 μm to approximately 80 μm, approximately 80 μm to approximately 90 μm, approximately 90 μm to approximately 100 μm. Optionally, the length O2 is in a range of approximately 25 μm to approximately 50 μm, e.g., approximately 33 μm.

In some embodiments, a ratio of the length O1 to the length O2 is in a range of approximately 2:1 to approximately 4:1, e.g., approximately 2:1 to approximately 2.5:1, approximately 2.5:1 to approximately 3:1, approximately 3:1 to approximately 3.5:1, and approximately 3.5:1 to approximately 4:1. Optionally, the ratio of the length O1 to the length O2 is in a range of approximately 2.5:1 to approximately 3.5:1, e.g., approximately 3:1.

Figure 10:
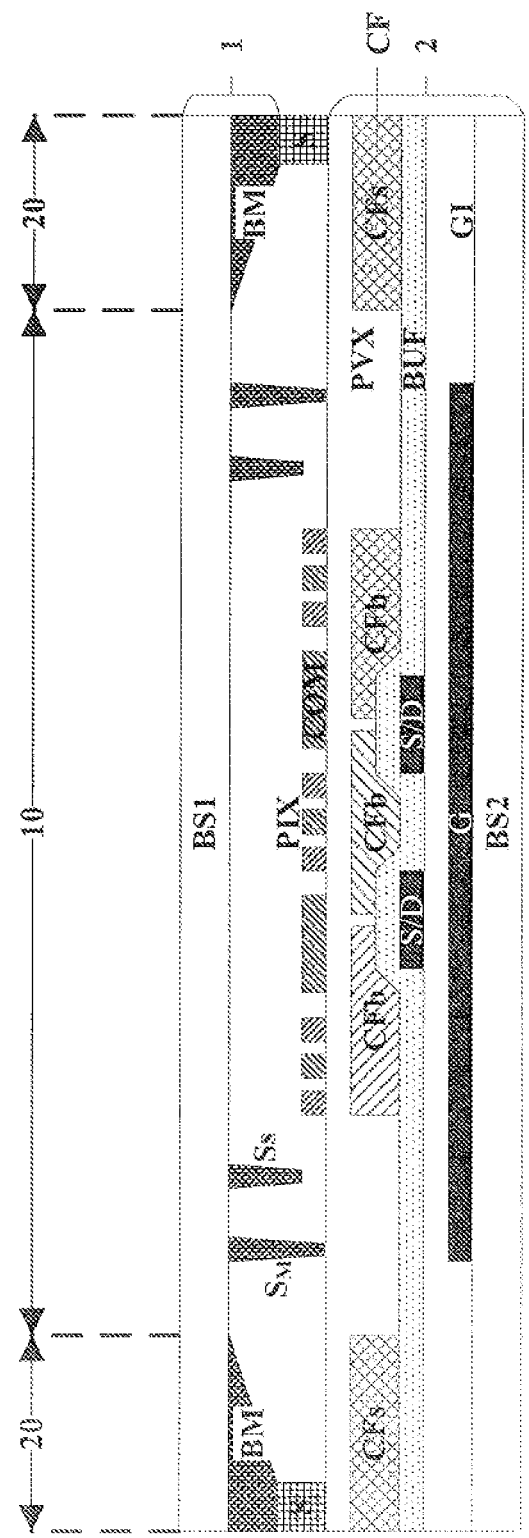
FIG. 10 is a schematic diagram illustrating the structure of a display apparatus in some embodiments according to the present disclosure.

FIG. 10 is a schematic diagram illustrating the structure of a display apparatus in some embodiments according to the present disclosure. Referring to FIG. 10, the second display substrate 2 in some embodiments further includes a color filter on the second base substrate BS2. The color filter CF includes a plurality of color filter blocks CFb in the display area 10, e.g., respectively in the plurality of subpixels for color display. Optionally, the color filter CF further includes one or more light shielding color filter blocks CFs in the black matrix area 20. The one or more light shielding color filter blocks CFs shields light together with the black matrix BM. In one example, the black matrix BM, the main spacer layer $S_M$, and the auxiliary spacer layer $S_S$ are all formed using a black photo spacer material, or an elastic black polymer. The material for making the black matrix BM, the main spacer layer $S_M$, and the auxiliary spacer layer $S_S$ in a same layer has relatively small optical density, e.g., less than 3.0, less than 2.0, or less than 1.0. As compared to a regular black matrix material (typically has an optical density approximately 4.0), the optical density of the material for making the black matrix BM, the main spacer layer $S_M$, and the auxiliary spacer layer $S_S$ in a same layer is small. Accordingly, by having one or more light blocking color filter blocks CFs in the black matrix area 20, a superior light shielding result in the black matrix area 20 can be achieved.

Optionally, an orthographic projection of the black matrix BM on the first base substrate BS1 substantially overlaps with an orthographic projection of the one or more light shielding color filter blocks CFs on the first base substrate BS1. As used herein, the term "substantially overlap" refers to two orthographic projections at least 50%, e.g., at least 60%, at least 70%, at least 80%, at least 90%, at least 95%, at least 99%, overlapping with each other.

The display apparatus may be any appropriate type of display apparatus. In some embodiments, the display apparatus is a liquid crystal display apparatus. In some embodiments, the display apparatus has a display mode selected from the group consisting of an in-plane switching mode, a Twisted Nematic mode, an Advanced Super Dimension Switch mode, and a High Aperture Ratio Advanced Super Dimension Switch mode. Optionally, the display apparatus is an in-plane switching type liquid crystal display apparatus. Examples of appropriate display apparatuses include, but are not limited to, an electronic paper, a mobile phone, a tablet computer, a television, a monitor, a notebook computer, a digital album, a GPS, etc.

In some embodiments, the second display substrate 2 further includes a common electrode and a pixel electrode for driving the liquid crystal layer. Optionally, and as shown in FIG. 10, the common electrode COM and the pixel electrode PIX are substantially on a same horizontal plane. Optionally, the common electrode COM and the pixel electrode PIX are in a same layer, e.g., made of a same conductive material, made in a same patterning process using a same mask plate.

Figure 11:
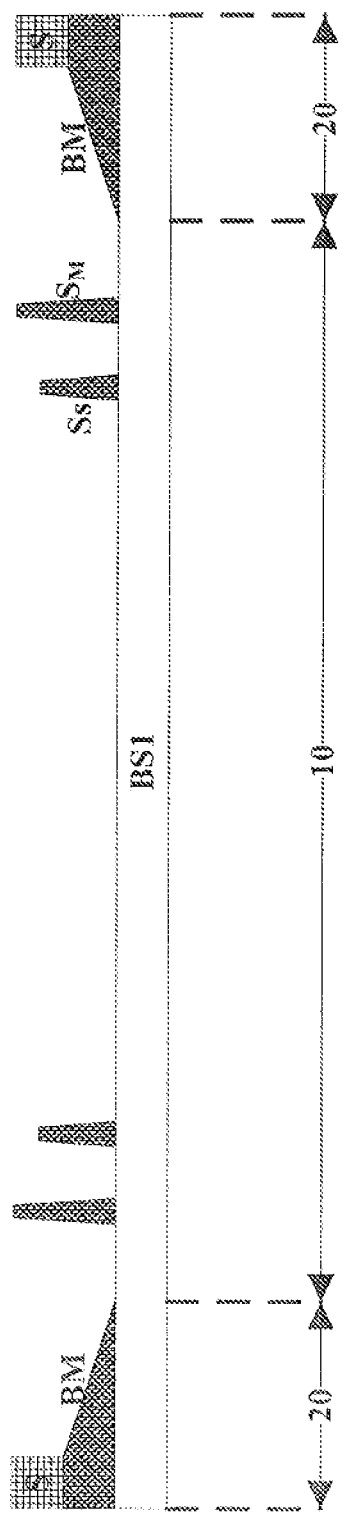
FIG. 11 is a schematic diagram illustrating the structure of a display substrate in some embodiments according to the present disclosure.

In another aspect, the present disclosure provides a display substrate having a display area and a black matrix area surrounding the display area. FIG. 1 is a schematic diagram illustrating the structure of a display substrate in some embodiments according to the present disclosure. Referring to FIG. 11, the display substrate in some embodiments includes a first base substrate BS1, and a black matrix BM on the first base substrate BS1 and in the black matrix area 20. In some embodiments, the black matrix has a serrated edge SE surrounding the display area 10. Optionally, and as shown in FIG. 4 and FIG. 9, the serrated edge SE includes a plurality of teeth. Optionally, the plurality of teeth distribute substantially throughout an entirety of a periphery of the serrated edge SE.

In some embodiments, and referring to FIG. 11, the display substrate further includes a main spacer layer $S_M$. The main spacer layer $S_M$ and the black matrix BM are made of a same material and in a same layer, e.g., made of a same black photo spacer material, made in a same patterning process using a same mask plate. In some embodiments, the display substrate further includes an auxiliary spacer layer $S_S$. The main spacer layer $S_M$, the auxiliary spacer layer $S_S$, and the black matrix BM are made of a same material and in a same layer, e.g., made of a same black photo spacer material, made in a same patterning process using a same mask plate.

Referring to FIG. 8, in some embodiments, the black matrix BM has a first side S1 facing the first base substrate BS1, a second side S2 substantially opposite to the first side S1 and facing away the first base substrate BS1, and a third side S3 connecting the first side S1 and the second side S2, the third side S3 along the serrated edge SE of the black matrix BM abutting the display area 10. The third side S3 has an average slope angle α with respect to the first side S1. The average slope angle α is relatively small, resulting in a small segment difference along the serrated edge of the black matrix BM abutting the display area 10. Optionally, the average slope angle α is in a range of less than 60 degrees, e.g., less than 55 degrees, less than 50 degrees, less than 45 degrees, less than 40 degrees, less than 35 degrees, less than 30 degrees, less than 25 degrees, less than 20 degrees, less than 15 degrees, and less than 10 degrees. Optionally, the average slope angle α is in a range of less than 30 degrees.

The plurality of teeth may be made of various appropriate shapes and dimensions. Optionally, each of the plurality of teeth has a substantially triangular shape. Optionally, each of the plurality of teeth has a substantially trapezoidal shape. Optionally, each of the plurality of teeth has a substantially elliptical shape. Optionally, one or more of the plurality of teeth has an irregular shape. Optionally, one or more of the plurality of teeth has a regular polygonal shape. Optionally, substantially all of the plurality of teeth in the serrated edge SE have a substantially the same shape. Optionally, the serrated edge SE includes at least a plurality of first teeth having a first shape and a plurality of second teeth having a second shape.

Referring to FIG. 8, in some embodiments, the display substrate further includes an alignment film PI formed on the first base substrate BS1 and at least partially covering the third side S3 along the serrated edge SE of the black matrix BM.

In another aspect, the present disclosure provides a method of fabricating a display substrate having a display area and a black matrix area surrounding the display area. In some embodiments, the method includes forming a black matrix on a first base substrate and in the black matrix area. Optionally, the black matrix is formed to have a serrated edge surrounding the display area. Optionally, the serrated edge is formed to have a plurality of teeth.

Figure 12A:
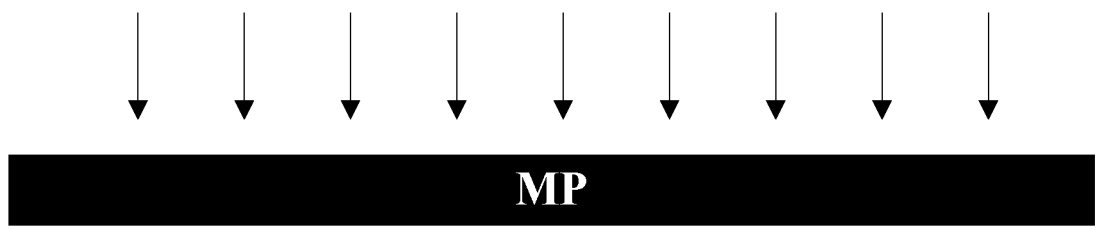
FIGS. 12A to 12D illustrate a process of fabricating a display substrate in some embodiments according to the present disclosure.
Figure 12B:
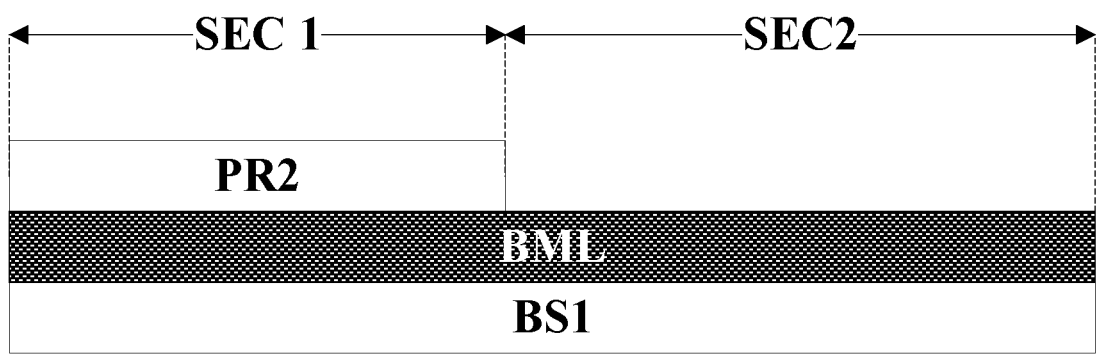
Figure 12C:
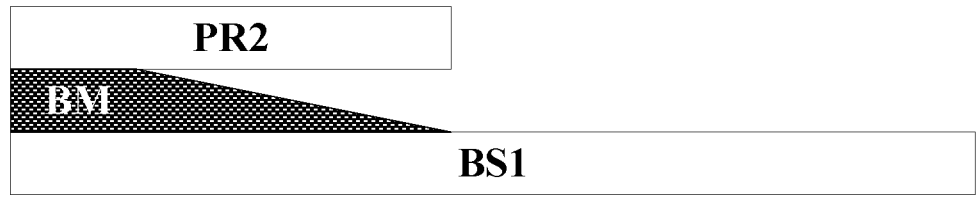
Figure 12D:

FIGS. 12A to 12D illustrate a process of fabricating a display substrate in some embodiments according to the present disclosure. Referring to FIG. 12A, in some embodiments, the step of forming the black matrix includes forming a black matrix material layer BML on the first base substrate BS1; forming a photoresist layer PR1 on a side of the black matrix material layer BML distal to the first base substrate BS1; and exposing the photoresist layer PR1 with a mask plate MP having a sub-resolution feature corresponding to the serrated edge of the black matrix BM thereby obtaining an exposed photoresist layer. Referring to FIG. 12B, in some embodiments, the step of forming the black matrix further includes developing the exposed photoresist layer to obtain a photoresist pattern PR2 including a first section SEC1 corresponding to the black matrix BM (to be formed) and a second section SEC2 corresponding to a remaining portion of the exposed photoresist layer, photoresist material being removed in the second section SEC2. Referring to FIG. 12C, the black matrix material layer BML in the second section SEC2 is etched. Referring to FIG. 12D, the photoresist pattern PR2 is then removed after the step of etching the black matrix material layer BML, thereby obtaining the black matrix BM with the serrated edge having the plurality of teeth.

Figure 13:
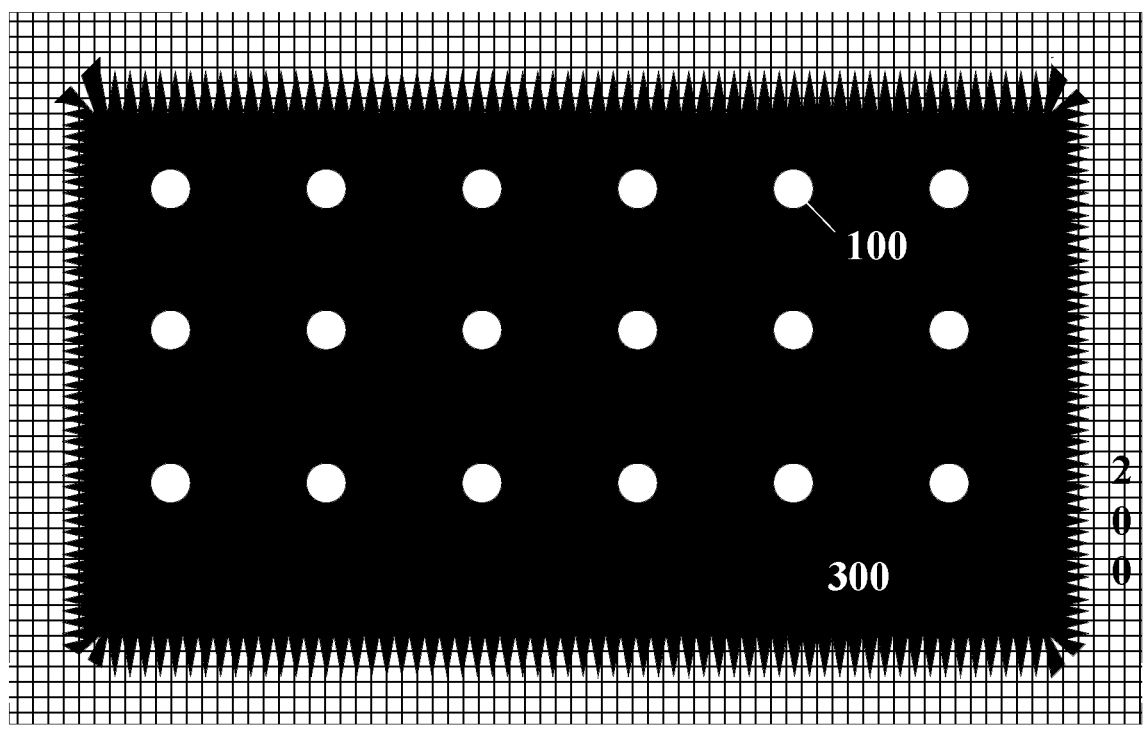
FIG. 13 is a schematic diagram illustrating a mask plate for patterning a black matrix in some embodiments according to the present disclosure.
Figure 14:
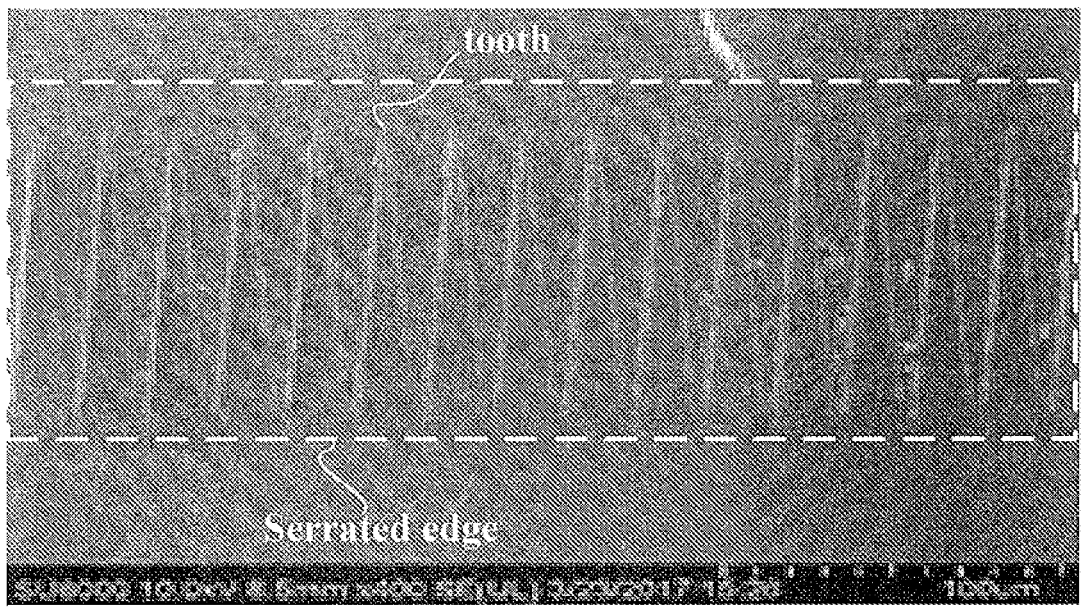
FIG. 14 is a scanning electron microscopy plan view image of a serrated edge formed using the mask plate described herein.

FIG. 13 is a schematic diagram illustrating a mask plate for patterning a black matrix in some embodiments according to the present disclosure. Referring to the FIG. 13, the mask plate has a resolution higher than the resolution of photoresist exposure unit/device. Due to the light scattering effect during the exposure and limited by the photoresist exposure resolution, the serrated edge having the plurality of teeth can be formed by exposure, development, etching, etc. FIG. 14 is a scanning electron microscopy plan view image of a serrated edge formed using the mask plate described herein.

In some embodiments, the method further includes forming a main spacer layer in a same patterning step as the black matrix. Optionally, the main spacer layer and the black matrix are formed in a same layer, and using a same material and a same mask plate. In some embodiments, the method further includes forming an auxiliary spacer layer in a same patterning step as the black matrix and the main spacer layer. Optionally, the main spacer layer, the auxiliary spacer layer, and the black matrix are formed in a same layer, and using a same material and a same mask plate.

In some embodiments, the main spacer layer, the auxiliary spacer layer, and the black matrix are formed using a same mask plate, e.g., a mask plate as shown in FIG. 13. In some embodiments, a negative black photo spacer material is used for making the main spacer layer, the auxiliary spacer layer, and the black matrix in a same layer. The mask plate includes a light transmissive region 100, a partially light transmissive region 200, and a light blocking region 300. The partially light transmissive region 200 includes a main body connected to a plurality of teeth, thereby forming a serrated edge. Tips of the plurality of teeth of the partially light transmissive region 200 has a resolution higher than the resolution of photoresist exposure unit/device. The bases of the plurality of teeth of the partially light transmissive region 200 has a resolution equal to or lower than the resolution of photoresist exposure unit/device. Due to the light scattering effect during the exposure, a black matrix material layer (e.g., a black negative photoresist material layer) in regions corresponding to the tips of the plurality of teeth of the partially light transmissive region 200 is still exposed, only to a lesser degree as compared to regions corresponding to the bases of the plurality of teeth of the partially light transmissive region 200. As a result, a black matrix layer having a serrated edge including a plurality of teeth is formed.

Figure 15:
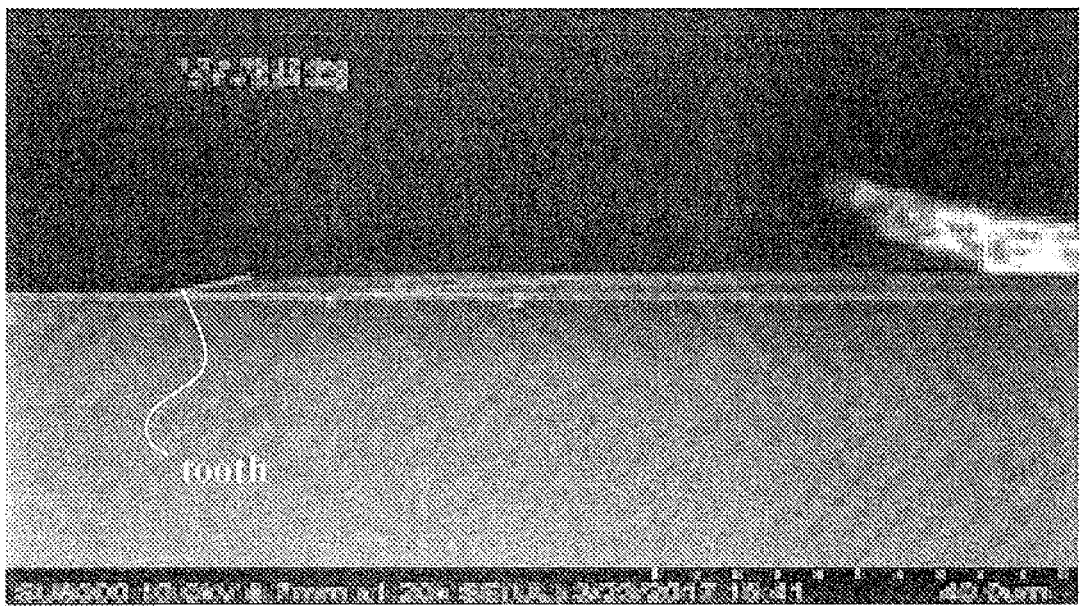
FIG. 15 is a scanning electron microscopy cross-sectional view image of one of a plurality of teeth of a serrated edge formed using the mask plate described herein.

Referring to FIG. 8, in some embodiments, the black matrix BM is formed to have a first side S1 facing the first base substrate BS1, a second side S2 substantially opposite to the first side S1 and facing away the first base substrate BS1, and a third side S3 connecting the first side S1 and the second side S2, the third side S3 along the serrated edge SE of the black matrix BM abutting the display area 10. The third side S3 is formed to have an average slope angle α with respect to the first side S1. The average slope angle α is relatively small, resulting in a small segment difference along the serrated edge of the black matrix BM abutting the display area 10. Optionally, the average slope angle α is in a range of less than 60 degrees, e.g., less than 55 degrees, less than 50 degrees, less than 45 degrees, less than 40 degrees, less than 35 degrees, less than 30 degrees, less than 25 degrees, less than 20 degrees, less than 15 degrees, and less than 10 degrees. Optionally, the average slope angle α is in a range of less than 30 degrees. FIG. 15 is a scanning electron microscopy cross-sectional view image of one of a plurality of teeth of a serrated edge formed using the mask plate described herein. Referring to FIG. 15, the average slope angle of the one of the plurality of teeth is approximately 10 degrees.

In another aspect, the present disclosure provides a method of fabricating a display apparatus. In some embodiments, the method includes forming a first display substrate according to the method described above; forming a second display substrate having an array of a plurality of thin film transistors on a second base substrate; and assembling the first display substrate and the second display substrate together thereby forming a cell.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus having a display area and a black matrix area surrounding the display area, comprising a first display substrate and a second display substrate opposite to each other and assembled together, and a liquid crystal layer between the first display substrate and the second display substrate;

wherein the first display substrate comprises a first base substrate, and a black matrix on the first base substrate and in the black matrix area, the black matrix comprising a black material;

wherein the second display substrate comprises a second base substrate, and an array of a plurality of thin film transistors on the second base substrate for driving image display in the display apparatus;

wherein the black matrix has a serrated edge surrounding the display area;

the serrated edge is an inner edge of the black matrix abutting the display area;

the black matrix comprises a plurality of teeth forming the serrated edge;

a respective one of the plurality of teeth has a first side facing the first base substrate, a second side substantially opposite to the first side and facing away the first base substrate, and a third side connecting the first side and the second side;

the third side has an average slope angle with respect to the first side less than 60 degrees and greater than 0 degree;

a thickness of the respective one of the plurality of teeth gradually decreases along a direction from the black matrix area to the display area.

2. The display apparatus of claim 1, wherein the first display substrate further comprises a main spacer layer configured to maintain a spacing between the first display substrate and the second display substrate;

wherein the main spacer layer and the black matrix are made of a same material and in a same layer.

3. The display apparatus of claim 2, wherein the first display substrate further comprises an auxiliary spacer layer;

wherein the main spacer layer, the auxiliary spacer layer, and the black matrix are made of a same material and in a same layer.

4. The display apparatus of claim 1, wherein the first display substrate further comprises an alignment film on the first base substrate and at least partially covering the third side of the respective one of the plurality of teeth.

5. The display apparatus of claim 1, wherein the display apparatus has an array of a plurality of subpixels; and
the serrated edge of the black matrix at least partially extends into regions corresponding to multiple subpixels of the plurality of subpixels along an edge of the display area.

6. The display apparatus of claim 1, wherein the second display substrate further comprises a color filter on the second base substrate;
the color filter comprises a plurality of color filter blocks respectively in a plurality of subpixels in the display area, and one or more light shielding color filter blocks in the black matrix area; and
an orthographic projection of the black matrix on the first base substrate substantially overlaps with an orthographic projection of the one or more light shielding color filter blocks on the first base substrate.

7. The display apparatus of claim 1, wherein the serrated edge comprises a plurality of teeth, each of which having a substantially triangular shape.

8. The display apparatus of claim 1, wherein the display apparatus is an in-plane switching type liquid crystal display apparatus;
wherein the second display substrate further comprises a common electrode and a pixel electrode substantially on a same horizontal plane.

9. A display substrate having a display area and a black matrix area surrounding the display area, comprising a base substrate, and a black matrix on the base substrate and in the black matrix area, the black matrix comprising a black material;
wherein the black matrix has a serrated edge surrounding the display area;
the serrated edge is an inner edge of the black matrix abutting the display area;
the black matrix comprises a plurality of teeth forming the serrated edge;
a respective one of the plurality of teeth has a first side facing the first base substrate, a second side substantially opposite to the first side and facing away the first base substrate, and a third side connecting the first side and the second side;
the third side has an average slope angle with respect to the first side less than 60 degrees and greater than 0 degree;
a thickness of the respective one of the plurality of teeth gradually decreases along a direction from the black matrix area to the display area.

10. The display substrate of claim 9, further comprising a main spacer layer; wherein the main spacer layer and the black matrix are made of a same material and in a same layer.

11. The display substrate of claim 10, further comprising an auxiliary spacer layer; wherein the main spacer layer, the auxiliary spacer layer, and the black matrix are made of a same material and in a same layer.

12. The display substrate of claim 9, further comprising an alignment film on the base substrate and at least partially covering the third side of the black matrix.

13. The display substrate of claim 9, wherein the serrated edge comprises a plurality of teeth, each of which having a substantially triangular shape.

14. A method of fabricating a first display substrate having a display area and a black matrix area surrounding the display area, comprising:
forming a black matrix using a black material on a first base substrate and in the black matrix area;
wherein the black matrix is formed to have a serrated edge surrounding the display area;
the serrated edge is an inner edge of the black matrix abutting the display area;
the black matrix comprises a plurality of teeth forming the serrated edge;
a respective one of the plurality of teeth has a first side facing the first base substrate, a second side substantially opposite to the first side and facing away the first base substrate, and a third side connecting the first side and the second side;
the third side has an average slope angle with respect to the first side less than 60 degrees and greater than 0 degree;
a thickness of the respective one of the plurality of teeth gradually decreases along a direction from the black matrix area to the display area.

15. The method of claim 14, wherein forming the black matrix comprises:
forming a black matrix material layer on the first base substrate;
forming a photoresist layer on a side of the black matrix material layer distal to the first base substrate;
exposing the photoresist layer with a mask plate having a sub-resolution feature corresponding to the serrated edge of the black matrix thereby obtaining an exposed photoresist layer;
developing the exposed photoresist layer to obtain a photoresist pattern including a first section corresponding to the black matrix and a second section corresponding to a remaining portion of the exposed photoresist layer, photoresist material being removed in the second section; and
etching the black matrix material layer in the second section, thereby obtaining the black matrix with the serrated edge.

16. The method of claim 14, further comprising forming a main spacer layer in a same patterning step as the black matrix;
wherein the main spacer layer and the black matrix are formed in a same layer, and using a same material and a same mask plate.

17. A method of fabricating a display apparatus, comprising:
forming the first display substrate according to the method of claim 14;
forming a second display substrate comprising an array of a plurality of thin film transistors on a second base substrate; and
assembling the first display substrate and the second display substrate together thereby forming a cell.

* * * * *